United States Patent
Yamawaki et al.

(10) Patent No.: US 8,396,430 B2
(45) Date of Patent: Mar. 12, 2013

(54) SEMICONDUCTOR INTEGRATED CIRCUIT DEVICE AND WIRELESS COMMUNICATION SYSTEM

(75) Inventors: Taizo Yamawaki, Kanagawa (JP); Tomonori Tanoue, Kanagawa (JP); Kazuaki Hori, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 107 days.

(21) Appl. No.: 13/114,340

(22) Filed: May 24, 2011

(65) Prior Publication Data

US 2011/0304388 A1 Dec. 15, 2011

(30) Foreign Application Priority Data

Jun. 15, 2010 (JP) ................................ 2010-136239

(51) Int. Cl.
 *H04B 1/44* (2006.01)
(52) U.S. Cl. ........ 455/78; 455/83; 455/13.3; 455/168.1; 330/101
(58) Field of Classification Search ............... 455/78, 455/83, 13.3, 82, 168.1, 306, 307, 562.1; 330/101, 133, 103
See application file for complete search history.

(56) References Cited

U.S. PATENT DOCUMENTS

| | | | | |
|---|---|---|---|---|
| 5,020,148 A * | 5/1991 | Bonato | ..................... | 455/302 |
| 5,809,405 A * | 9/1998 | Yamaura | ..................... | 455/101 |
| 5,815,804 A * | 9/1998 | Newell et al. | ..................... | 455/78 |
| 5,910,756 A * | 6/1999 | Ella | ..................... | 333/133 |
| 6,490,451 B1 * | 12/2002 | Denman et al. | ..................... | 455/436 |
| 6,745,046 B1 * | 6/2004 | Eckert et al. | ..................... | 455/552.1 |
| 6,975,841 B2 * | 12/2005 | Uriu et al. | ..................... | 455/78 |
| 7,184,440 B1 * | 2/2007 | Sterne et al. | ..................... | 370/395.52 |
| 7,698,443 B2 * | 4/2010 | Yaffe et al. | ..................... | 709/229 |
| 8,248,179 B2 * | 8/2012 | Takahashi | ..................... | 333/24.2 |
| 2003/0092397 A1 * | 5/2003 | Uriu et al. | ..................... | 455/82 |
| 2009/0086655 A1 * | 4/2009 | Ghadaksaz | ..................... | 370/293 |
| 2011/0128885 A1 * | 6/2011 | Breslin et al. | ..................... | 370/253 |
| 2011/0234332 A1 * | 9/2011 | Takahashi | ..................... | 333/1.1 |

OTHER PUBLICATIONS

X. Yang, et al., A 90nm CMOS Direct Conversion Transmitter for WCDMA, IEEE Radio Frequency Integrated Circuits Symposium, 2007, pp. 17-20.
T. Keiler et al., A Split Band Duplexer for PCS CDMA Mobile Phones, IEEE Radio and Wireless Conference, 2004, pp. 499-502.

* cited by examiner

*Primary Examiner* — Minh D Dao
(74) *Attorney, Agent, or Firm* — Mattingly & Malur, PC

(57) ABSTRACT

Disclosed are a semiconductor integrated circuit device and a wireless communication system that are capable of improving reception sensitivity. The wireless communication system includes, for instance, a first duplexer, a second duplexer, a first low-noise amplifier circuit, and a second low-noise amplifier circuit. A transmission band compliant with a communication standard is split into two segments for use, namely, low- and high-frequency transmission bands. A reception band compliant with the communication standard is split into two segments for use, namely, low- and high-frequency reception bands. The first duplexer uses the low-frequency transmission band and low-frequency reception band as passbands. The second duplexer uses the high-frequency transmission band and high-frequency reception band as passbands. A signal received from the first duplexer and a signal received from the second duplexer are respectively amplified by the first and the second low-noise amplifier circuits, which are respectively provided to handle such signals.

16 Claims, 11 Drawing Sheets

SEMICONDUCTOR INTEGRATED CIRCUIT DEVICE AND WIRELESS COMMUNICATION SYSTEM

CROSS-REFERENCE TO RELATED APPLICATIONS

The disclosure of Japanese Patent Application No. 2010-136239 filed on Jun. 15, 2010 including the specification, drawings, and abstract is incorporated herein by reference in its entirety.

BACKGROUND

The present invention relates to a semiconductor integrated circuit device and a wireless communication system. More particularly, the present invention relates to a wireless communication system that isolates a transmission signal and a received signal with a duplexer, and to an effective technology applicable to a high-frequency signal processing LSI that serves as a part of the wireless communication system and provides conversion between a high-frequency signal and a baseband signal.

In a configuration described, for instance, in a document titled "A 90 nm CMOS Direct Conversion Transmitter for WCDMA," Radio Frequency Integrated Circuits (RFIC) Symposium, 2007 IEEE, by Xuemin Yang and three other authors, a duplexer is disposed between a transmission power amplifier circuit and a reception low-noise amplifier (LNA) circuit to isolate a transmission signal from a received signal. In a configuration described, for instance, in a document titled "A Split Band Duplexer for PCS CDMA Mobile Phones," Radio and Wireless Conference, 2004 IEEE, by Torsten Keiler and another author, the band for transmission signals is split into two segments so that each transmission signal is coupled to one antenna port through an SPDT (Single-Pole Double-Throw) switch.

SUMMARY

In recent years, many wireless communication systems are widely used typically for mobile phones with the communication speed of each system increasingly raised. Qualitatively, the width of a guard band decreases while the width of a band required for each system increases. Meanwhile, the mobile phones have experienced a transition from the second generation to the third generation so as to use communication standards such as W-CDMA (Wideband Code Division Multiple Access), which is also referred to as UMTS (Universal Mobile Telecommunications System). During the second generation, the TDD (Time Division Duplex) method was widely used to switch between transmission and reception. During the third generation, that is, during the use of W-CDMA or like communication standard, the FDD (Frequency Division Duplex) method is used.

W-CDMA defines more than 10 bands. Band 3, for example, provides a transmission band of 1710 to 1785 MHz and a reception band of 1805 to 1880 MHz. When a duplexer is used in this instance to switch between transmission and reception, the duplexer needs to have such filter characteristics that allow a 75 MHz portion of both the transmission and reception bands to pass and suppress a 20 MHz portion between the transmission and reception bands. In other words, it is necessary that the filter characteristics allow frequencies within a wide band to pass with low loss and drastically attenuate frequencies outside a passband.

In general, however, the filter characteristics are such that there is a tradeoff between the bandpass characteristics of the passband and the rejection characteristics (attenuation slope) of a non-passband. More specifically, the lower the insertion loss of the passband, the more difficult it is to drastically attenuate the non-passband (the smaller the attenuation slope). Conversely, the higher the insertion loss of the passband, the easier it is to drastically attenuate the non-passband (the greater the attenuation slope). Further, the attenuation slope decreases with an increase in the width of the passband. Conversely, the attenuation slope increases with a decrease in the width of the passband. When the aforementioned duplexer for band 3 is built, the characteristics of the attenuation slope take precedence. Therefore, the insertion loss of the passband increases to decrease reception sensitivity and increase the power consumption of a power amplifier circuit during transmission. This transmission problem can be avoided, for instance, by employing a configuration in which the transmission band is split into two segments and the output of each part is coupled to an antenna through a selector switch. In this case, too, however, the selector switch may cause insertion loss. Therefore, the power consumption of the power amplifier circuit may not be sufficiently reduced.

The present invention has been made in view of the above circumstances, and provides a semiconductor integrated circuit device and a wireless communication system that are capable of improving reception sensitivity. The present invention also provides a semiconductor integrated circuit device and a wireless communication system that are capable of reducing the power consumption during transmission. The above and other advantages and novel features of the present invention will become apparent from the following detailed description taken in conjunction with the accompanying drawings.

A representative embodiment of the present invention disclosed in this document is briefly summarized below.

The wireless communication system according to an embodiment of the present invention includes a first duplexer, a second duplexer, a first low-noise amplifier circuit, and a second low-noise amplifier circuit. The first low-noise amplifier circuit amplifies a received signal input through the first duplexer. The second low-noise amplifier circuit amplifies a received signal input through the second duplexer. The first and second duplexers are provided in correspondence with a first standard band defined by a communication standard. The first duplexer has a first transmission passband and a first reception passband, whereas the second duplexer has a second transmission passband and a second reception passband. A first transmission standard band and a first reception standard band are defined for the first standard band. A first transmission passband is set in correspondence with a first segmented transmission band, which is a part of the first transmission standard band. A first reception passband is set in correspondence with a first segmented reception band, which is a part of the first reception standard band. Further, a second transmission passband is set in correspondence with a second segmented transmission band, which is another part of the first transmission standard band and higher in frequency than the first segmented transmission band, and a second reception passband is set in correspondence with a second segmented reception band, which is another part of the first reception standard band and higher in frequency than the first segmented reception band.

As described above, the wireless communication system is configured so as to process the first segmented transmission (reception) band with the first duplexer and the second segmented transmission (reception) band with the second duplexer by using the first and second segmented transmission bands (second>first), which are obtained by splitting a transmission standard band compliant with the communication standard, and the first and second segmented reception bands (second>first), which are obtained by splitting a reception standard band compliant with the communication standard. When the standard bands are split as described above, the insertion loss of the filter characteristics of each duplexer can be reduced. Further, the wireless communication system is configured so as to use one low-noise amplifier circuit to amplify signals received through the first duplexer and use another low-noise amplifier circuit to amplify signals received through the second duplexer. In contrast to a situation where, for example, a single low-noise amplifier circuit is shared, the above-described configuration ensures that the signals received through the individual duplexers can be transmitted to the low-noise amplifier circuits with low loss. This makes it possible to improve reception sensitivity.

The above-described wireless communication system further includes a first power amplifier circuit, which outputs a transmission signal to the first duplexer, and a second power amplifier circuit, which outputs a transmission signal to the second duplexer. In contrast to a situation where, for example, a single power amplifier circuit is shared, the use of the two power amplifier circuits ensures that the signals transmitted from the power amplifier circuits can be conveyed to the duplexers with low loss. In addition, the insertion loss in the duplexers can be reduced by splitting the standard bands as described earlier. As a result, the power consumption during transmission can be reduced.

In short, the representative embodiment of the present invention disclosed in this document enables the wireless communication system to improve reception sensitivity.

BRIEF DESCRIPTION OF THE DRAWINGS

An embodiment of the present invention will be described in detail based on the following figures, in which.

DETAILED DESCRIPTION

Figure 1:
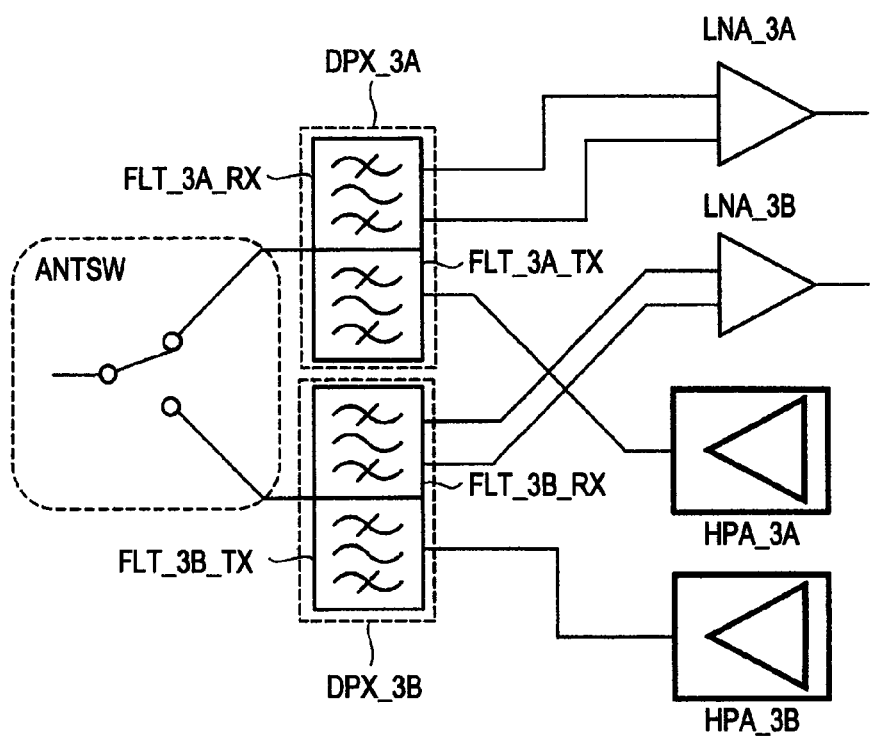
FIG. 1 is a schematic diagram illustrating an example configuration of essential parts of a wireless communication system according to a first embodiment of the present invention.

In the following description of the embodiments, if necessary for convenience sake, a description of the present invention will be given in a divided manner in plural sections or embodiments, but unless otherwise stated, they are not unrelated to each other, but are in a relation such that one is a modification, represents details, or is a supplementary explanation, of a part or the whole of the other. Also, in the embodiments described below, when referring to the number of elements (including the number of pieces, numerical values, amounts, ranges, and the like), the number of elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, the positional relationship therebetween, and the like are mentioned, the substantially approximate and similar shapes and the like are included therein unless otherwise stated or except the case where it is conceivable that they are apparently excluded in principle. The same goes for the aforementioned numerical values and ranges.

Furthermore, circuit elements configuring respective functional blocks of the embodiments are formed over a semiconductor substrate such as single crystal silicon by an integrated circuit technology, for instance, of a publicly-known CMOS (complementary metal-oxide semiconductor transistor) although there is no particular limitation. It should be noted that, in the embodiments, a MOSFET (metal oxide semiconductor field effect transistor) is used as an example of a MISFET (metal insulator semiconductor field effect transistor). However, it does not mean that a non-oxidized film is unacceptable as a gate insulating film. Embodiments of the present invention will now be described in detail with reference to the accompanying drawings. In all the drawings illustrating the embodiments, like members are designated by the same reference numerals and will not be redundantly described.

First Embodiment

FIG. 1 is a schematic diagram illustrating an example configuration of essential parts of a wireless communication system according to a first embodiment of the present invention. The wireless communication system shown in FIG. 1 includes two duplexers DPX_3A, DPX_3B, two low-noise amplifier circuits LNA_3A, LNA_3B, two high-frequency power amplifier circuits (power amplifier circuits) HPA_3A, HPA_3B, and an antenna switch circuit ANTSW. The DPX_3A has a transmission filter circuit FLT_3A_TX and a reception filter circuit FLT_3A_RX. The DPX_3B has a transmission filter circuit FLT_3B_TX and a reception filter circuit FLT_3B_RX.

The ANTSW selectively couples an antenna (not shown) to either the DPX_3A or the DPX_3B. The HPA_3A amplifies a transmission high-frequency signal and outputs it to the ANTSW through the FLT_3A_TX of the DPX_3A. Meanwhile, a received signal transmitted to the DPX_3A through the ANTSW is input into the LNA_3A through the FLT_3A_RX and amplified by the LNA_3A. Similarly, the HPA_3B amplifies a transmission high-frequency signal and outputs it to the ANTSW through the FLT_3B_TX of the DPX_3B. Meanwhile, a received signal transmitted to the DPX_3B through the ANTSW is input into the LNA_3B through the FLT_3B_RX and amplified by the LNA_3B.

Figure 2:
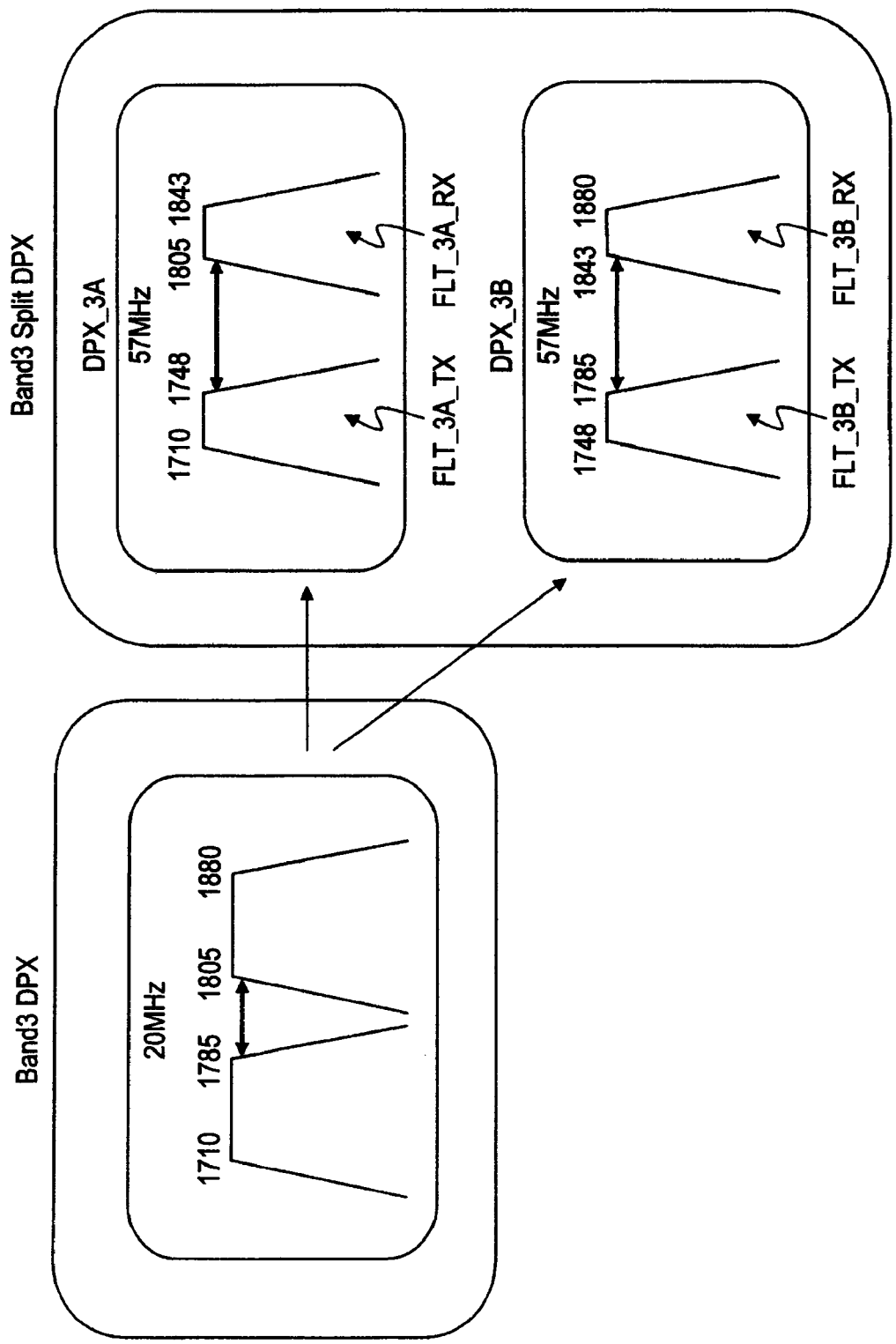
FIG. 2 is a diagram illustrating exemplary filter characteristics of duplexers shown in FIG. 1.

FIG. 2 is a diagram illustrating exemplary filter characteristics of the duplexers DPX_3A, DPX_3B shown in FIG. 1. When, for instance, the aforementioned band 3 communication standard defined by W-CDMA is used, the defined frequency range is between 1710 and 1785 MHz for transmission band 3 and between 1805 and 1880 MHz for reception band 3. In the present embodiment, transmission band 3 and reception band 3 are both split into plural segments (two segments in the currently used example). For example, transmission band 3 is split into transmission band 3A, which is a low-frequency band of 1710 to 1748 MHz, and transmission band 3B, which is a high-frequency band of 1748 to 1785 MHz, and reception band 3 is split into reception band 3A, which is a low-frequency band of 1805 to 1843 MHz, and reception band 3B, which is a high-frequency band of 1843 to 1880 MHz. The FLT_3A_TX of the DPX_3A uses low-frequency transmission band 3A as a passband, whereas the FLT_3A_RX uses low-frequency reception band 3A as a passband. Similarly, the FLT_3B_TX of the DPX_3B uses high-frequency transmission band 3B as a passband, whereas the FLT_3B_RX uses high-frequency reception band 3B as a passband.

When the above-described configuration is employed, each of the duplexers DPX_3A, DPX_3B should have two 37 MHz (38 MHz) wide passbands and a 57 MHz stopband between the two passbands. If, for instance, the employed configuration includes only one duplexer, it is necessary to provide two 75 MHz wide passbands and a 20 MHz stopband between the two passbands. Therefore, the use of the configuration shown in FIGS. 1 and 2 increases a design margin for attenuation slope and decreases the widths of the passbands. This makes it possible to greatly reduce the passband insertion loss in each duplexer. Further, the use of a wide stopband makes it possible to provide adequate isolation between transmission and reception.

In FIG. 2, it is assumed that the upper limit (1748 MHz) for the passband of transmission band 3A is equal to the lower limit for the passband of transmission band 3B, and that the upper limit (1843 MHz) for the passband of reception band 3A is equal to the lower limit for the passband of reception band 3B. However, these limit values need not always be equal to each other. When, for instance, bands (transmission band and reception band) defined by a frequency range between frequencies F1 and F2 according to a communication standard are split into two segments, that is, low-frequency band A and high-frequency band B, at least an overlap should exist between the passband of band A and the passband of band B. More specifically, the passband of band A is between frequency F1 and frequency F3 (F1<F3<F2) and the passband of band B is between frequency F4 and frequency F2 (F1<F4<F2). It is therefore necessary that frequency F4 be not higher than frequency F3 (F4≦F3).

As is obvious from FIG. 2, however, it is particularly preferred that the overlap be small (that is, F4=F3), and that the difference between (F3−F1) and (F2−F4) be small. This minimizes the overall passbands for bands A and B and maximizes the interval between neighboring bands (that is, the design margin for attenuation slope). As a result, the passband insertion loss can be greatly reduced. When the filter circuits are to be actually designed, the actual design values of frequencies F1, F2, F3, and F4 are determined in consideration, for instance, of a margin for filter circuit manufacture variation.

In the above example, it is assumed that the transmission band and reception band are split into two segments. Alternatively, however, the bands may be split into three or more segments. It should be noted in this connection that at least a channel bandwidth (e.g., 5 MHz for W-CDMA) needs to be provided as the passband for each filter circuit. Therefore, the maximum number of segments is limited by the channel bandwidth. When, for instance, the bands are split into three segments, the configuration should include a duplexer having a transmission band of 1710 to 1735 MHz and a reception band of 1805 to 1830 MHz, a duplexer having a transmission band of 1735 to 1760 MHz and a reception band of 1830 to 1855 MHz, and a duplexer having a transmission band of 1760 to 1785 MHz and a reception band of 1855 to 1880 MHz.

As described above, increasing the number of segments decreases the passband width of each duplexer and increases the design margin for attenuation slope. However, unlike the low-noise amplifier circuits LNA and the like, which can be integrated in an LSI, each duplexer is often implemented as a component over a wiring board. In this instance, an increase in the number of segments might increase, for example, the component cost and the system size. In reality, therefore, it is preferred that the number of segments be the minimum required number of segments for providing the filtering characteristics required of the duplexers. In the currently used example, it is assumed that W-CDMA is used as the communication standard. However, it is obvious that CDMA2000 and other communication standards are also applicable.

Further, the example configuration shown in FIG. 1 includes the power amplifier circuits HPA and low-noise amplifier circuits LNA, which correspond to the transmission and reception filter circuits FLT in each duplexer DPX on a one-to-one basis. No selector switch or other similar component is provided between the duplexers DPX, power amplifier circuits HPA, and low-noise amplifier circuits LNA. This reduces the loss in a path between the antenna switch circuit ANTSW and the low-noise amplifier circuits LNA, thereby improving reception sensitivity. Further, as it is possible to reduce the loss in a path between the power amplifier circuits HPA and the antenna switch circuit ANTSW, the power consumption of the power amplifier circuits HPA can be reduced. If it is assumed for comparison purposes that the configuration includes a selector switch, the selector switch may increase the insertion loss by approximately 0.5 dB. Further, if it is assumed for comparison purposes that a single duplexer is used for transmission and reception without band splitting, the loss between the outputs of the power amplifier circuits HPA and the output of the antenna switch circuit ANTSW and the loss between the input of the antenna switch circuit ANTSW and the input of the low-noise amplifier circuits LNA can be approximately 5 dB, respectively. However, the example configuration according to the present embodiment makes it possible to reduce each loss to approximately 1.5 dB.

Second Embodiment

Figure 3:
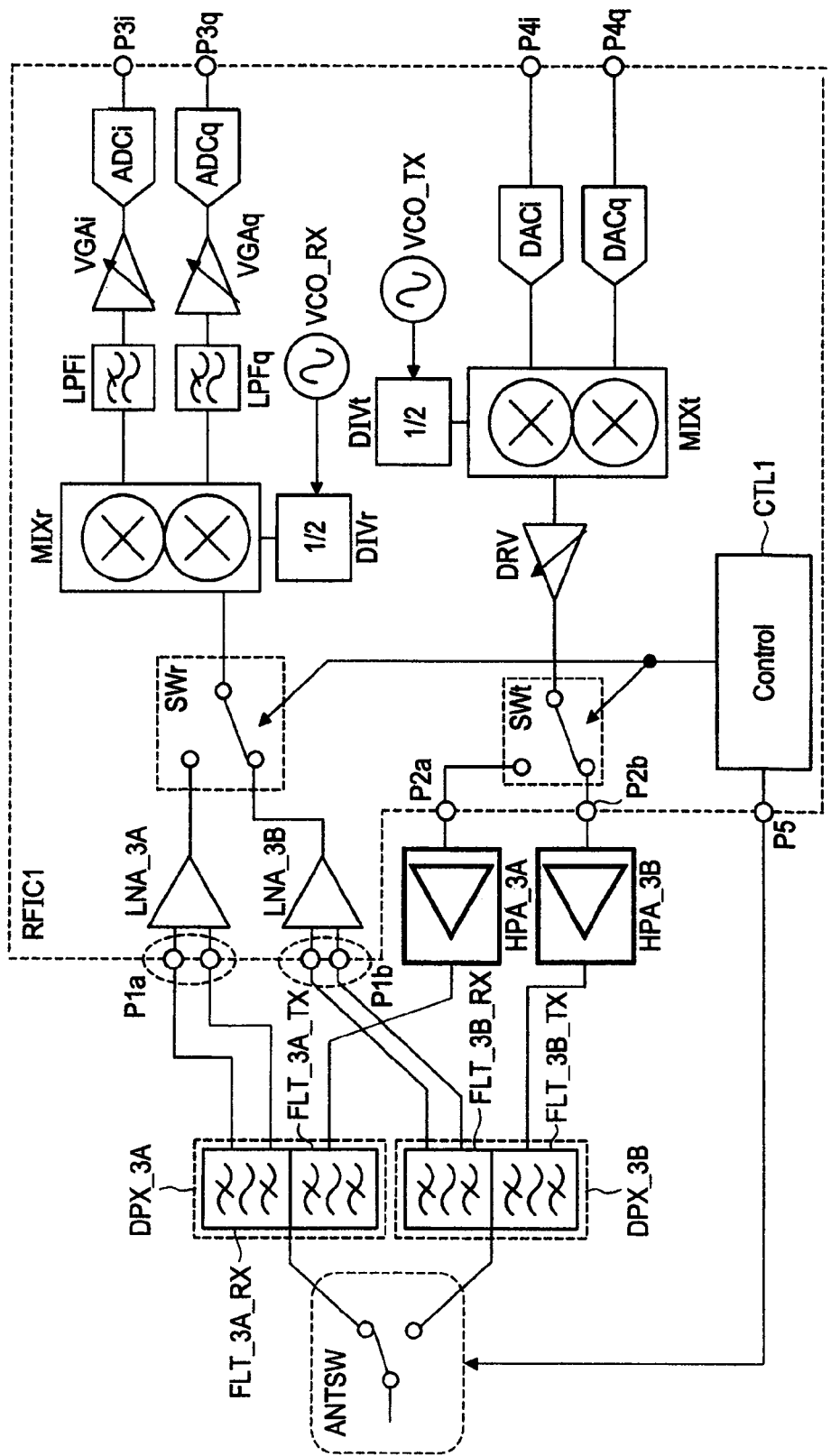
FIG. 3 is a block diagram illustrating an overview of an example configuration of the wireless communication system according to a second embodiment of the present invention.

A second embodiment of the present invention will now be described by explaining about the details of an example configuration of the wireless communication system to which the method according to the first embodiment is applied. FIG. 3 is a block diagram illustrating an overview of the example configuration of the wireless communication system according to the second embodiment of the present invention. The wireless communication system shown in FIG. 3 includes a high-frequency signal processing LSI (semiconductor integrated circuit device) RFIC1, two power amplifier circuits HPA_3A, HPA_3B, two duplexers DPX_3A, DPX_3B, and an antenna switch circuit ANTSW. The power amplifier circuits HPA_3A, HPA_3B, the duplexers DPX_3A, DPX_3B, and the antenna switch circuit ANTSW are identical with the corresponding elements included in the example configuration shown in FIG. 1. The low-noise amplifier circuits LNA_3A, LNA_3B shown in FIG. 1 are incorporated in the high-frequency signal processing LSI RFIC1 shown in FIG. 3.

The RFIC1 is implemented, for instance, by a semiconductor chip (semiconductor package) and includes external terminals P1a, P1b, P2a, P2b, P3i, P3q, P4i, P4q, and P5. Here, it is assumed that the P1a, P1b, P2a, and P2b are disposed in the order named and in a particular direction. However, this order does not indicate that these external terminals are adjacent to each other, but indicates their relative positional relationship. It means that some other external terminals may be disposed between the above-mentioned external terminals. The RFIC1 includes a reception internal circuit, a transmission internal circuit, and a control circuit CTL1 that controls these internal circuits. The reception internal circuit includes a switch circuit SWr, a mixer circuit MIXr, a frequency divider circuit DIVr, an oscillator circuit VCO_RX, low-pass filter circuits LPFi, LPFq, variable-gain amplifier circuits VGAi, VGAq, and analog-to-digital converter circuits ADCi, ADCq in addition to the low-noise amplifier circuits LNA_3A, LNA_3B. The transmission internal circuit includes digital-to-analog converter circuits DACi, DACq, a mixer circuit MIXt, a frequency divider circuit DIVt, an oscillator circuit VCO_TX, a driver circuit DRV, and a switch circuit SWt.

A received signal output from the filter circuit FLT_3A_RX of the aforementioned duplexer DPX_3A is input into the LNA_3A through the external terminal P1a, whereas a received signal output from the FLT_3B_RX of the DPX_3B is input into the LNA_3B through the P1b. The LNA_3A and LNA_3B amplify the input received signal at low noise and output it to the switch circuit SWr. In accordance with a selection signal from the control circuit CTL1, the SWr outputs an output signal of either the LNA_3A or LNA_3B to the mixer circuit MIXr. The VCO_RX generates a local oscillator signal having a predetermined frequency. The DIVr frequency-divides the local oscillator signal by two. The DIVr also generates orthogonal signals that differ in phase by 90 degrees, and supplies the orthogonal signals to the MIXr. The MIXr converts an output signal of the SWr to received baseband signals (I signal and Q signal) by using the orthogonal signals (direct conversion). The I signal is bandwidth-limited by the baseband low-pass filter circuit LPFi and amplified to a required level by the variable-gain amplifier circuit VGAi. The ADCi converts an output signal of the VGAi to a digital signal and outputs it to the external terminal P3i. Similarly, the Q signal is passed through the LPFq and VGAq, converted to a digital signal by the ADCq, and output from the external terminal P3q.

Meanwhile, transmission baseband signals (I signal and Q signal) input from the external terminals P4i, P4q are respectively converted to analog signals by the digital-to-analog converter circuits DACi, DACq, and then input into the mixer circuit MIXt. The VCO_TX generates a local oscillator signal having a predetermined frequency. The DIVt frequency-divides the local oscillator signal by two. The DIVt also generates orthogonal signals and supplies them to the MIXt. The MIXt converts output signals of the DACi and DACq to high-frequency signals, respectively, by using the orthogonal signals, combines the resulting high-frequency signals to form a transmission signal, and outputs the transmission signal to the driver circuit DRV. The DRV amplifies the input transmission signal to a required level and outputs it to the switch circuit SWt. In accordance with a selection signal from the control circuit CTL1, the SWt outputs the transmission signal from the DRV to either the external terminal P2a or P2b. The transmission signal output from the P2a is amplified by the power amplifier circuit HPA_3A, whereas the transmission signal output from the P2b is amplified by the power amplifier circuit HPA_3B.

In accordance with a command, for instance, from a later-described baseband processing circuit, the control circuit CTL1 controls destinations to which switches are to be coupled. More specifically, when a reception frequency band and a transmission frequency band are respectively included in the reception passband (FLT_3A_RX) and transmission passband (FLT_3A_TX) of the DPX_3A, the ANTSW is coupled to the DPX_3A through the P5 and the SWr and SWt are respectively coupled to the P1a and P2a. When, on the other hand, the reception frequency band and the transmission frequency band are respectively included in the reception passband (FLT_3B_RX) and transmission passband (FLT_3B_TX) of the DPX_3B, the ANTSW is coupled to the DPX_3B through the P5 and the SWr and SWt are respectively coupled to the P1b and P2b.

When two duplexers share a mixer circuit, a reception circuit may be configured as shown in FIG. 3 so that the switch circuit SWr is disposed ahead of two low-noise amplifier circuits. An alternative configuration may be such that two duplexers are coupled to one low-noise amplifier circuit through a selector switch circuit. When the alternative configuration is employed, for example, a loss in the selector switch circuit, a reception sensitivity decrease caused by noise, and a system size increase caused by the installation of the selector switch circuit external to the high-frequency signal processing LSI are anticipated. When, on the other hand, the example configuration shown in FIG. 3 is used, the anticipated problems can be addressed unlike the case where the aforementioned alternative configuration is used. Specifically, the noise figure (NF) in a reception system is such that the degree of deterioration increases with a decrease in the distance of a loss from an antenna. Therefore, benefits are gained when the switch circuit SWr is disposed toward the output side of the low-noise amplifier circuit and not disposed toward the input side, as shown in FIG. 3. In this instance, the resulting circuit area overhead is insignificant because the switch circuit SWr is integrated in the RFIC1.

Meanwhile, a transmission circuit may be configured as shown in FIG. 3 so that the switch circuit SWt is coupled to two duplexers through two power amplifier circuits. An alternative configuration may be such that one power amplifier circuit is coupled to two duplexers through the switch circuit. When the above alternative configuration is used, an increase in the power consumption of the power amplifier circuit anticipated due to a loss in the switch circuit. In the case of a transmission power amplifier circuit, for instance, for a battery-driven mobile phone system, it is important that the loss of transmission power be reduced from the viewpoint of the duration of battery power. Therefore, reducing the power consumption of the power amplifier circuit by using the example configuration shown in FIG. 3 is more beneficial than when the above-mentioned alternative configuration is used.

Figure 4:
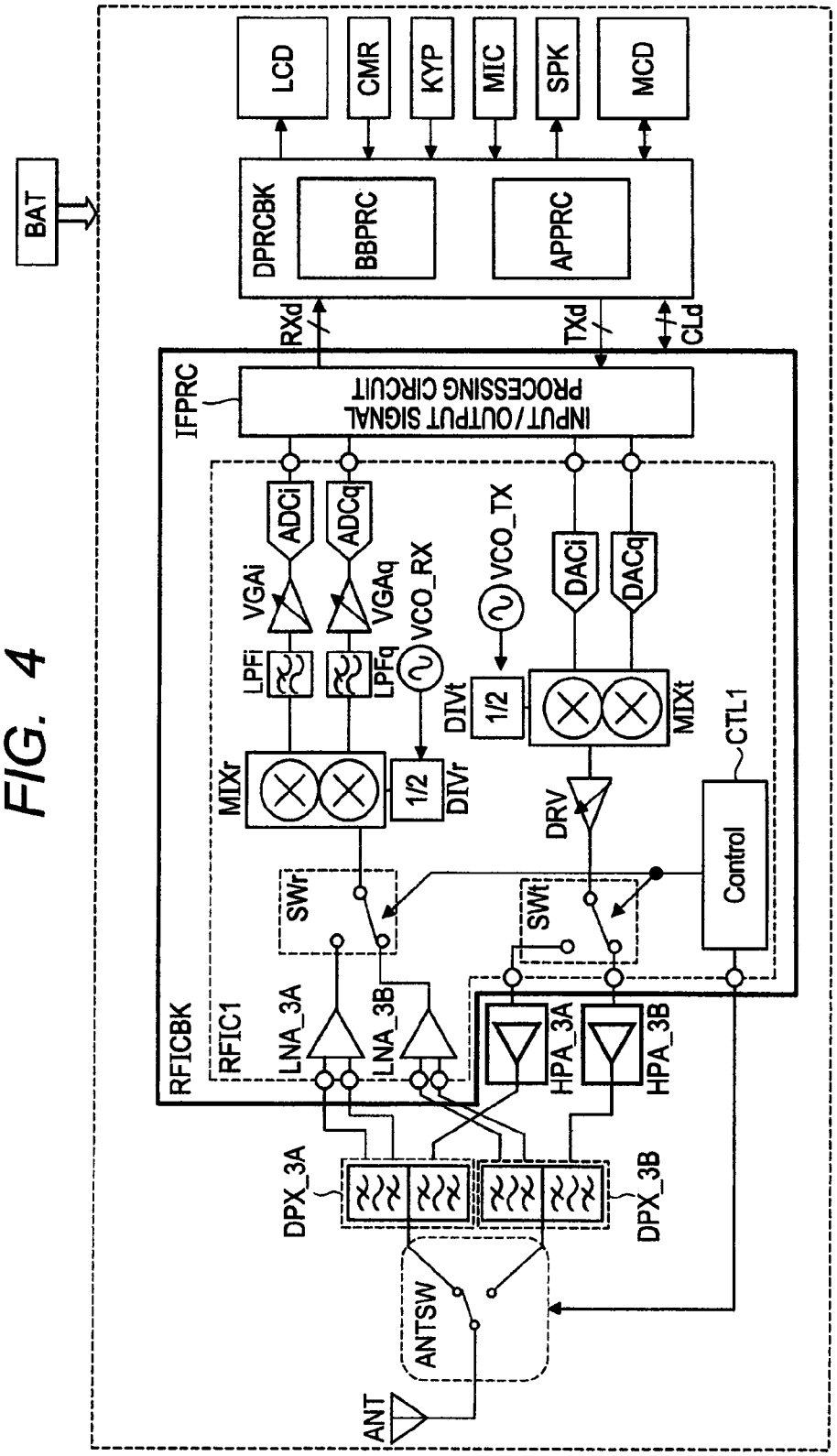
FIG. 4 is a block diagram illustrating an exemplary overall configuration of a mobile phone system to which the wireless communication system shown in FIG. 3 is applied.

FIG. 4 is a block diagram illustrating an exemplary overall configuration of a mobile phone system to which the wireless communication system shown in FIG. 3 is applied. The mobile phone system shown in FIG. 4 is compliant, for instance, with W-CDMA. The system is battery-driven and includes an antenna ANT, an antenna switch circuit ANTSW, duplexers DPX_3A, DPX_3B, power amplifier circuits HPA_3A, HPA_3B, a high-frequency signal processing block RFICBK, a digital signal processing block DPRCBK, and various peripheral devices. The peripheral devices include, for instance, a display LCD, a camera CMR, a keypad KYP, a microphone MIC, a speaker SPK, and a memory card MCD. The ANTSW, DPX_3A, DPX_3B, HPA_3A, and HPA_3B are identical with the corresponding elements included in the example configuration shown in FIG. 3. The ANT, which is coupled to one end of the ANTSW, is coupled to either the DPX_3A or the DPX_3B through the ANTSW.

The RFICBK is implemented, for instance, by a semiconductor chip (semiconductor package). It includes an input/output signal processing circuit IFPRC in addition to the high-frequency signal processing LSI (RFIC1) shown in FIG. 3. The IFPRC receives digital signals from the analog-to-digital converter circuits ADCi, ADCq in the RFIC1, subjects the received digital signals to digital filter processing or the like, and outputs a digital received signal RXd to the DPRCBK by using an LVDS (Low Voltage Differential Signaling) or other interface circuit. Further, the IFPRC receives a digital transmission signal TXd from the DPRBK by using an LVDS or other interface circuit, subjects the received signal to digital filter processing or the like, and outputs the processed signal to the digital-to-analog converter circuits DACi, DACq in the RFIC1.

The DPRCBK includes a baseband processing circuit BBPRC for processing a communication protocol and an application processing circuit APPRC for processing various applications. The APPRC not only controls the aforementioned peripheral devices, but also exchanges external communication digital data signals with the BBPRC. The BBPRC receives the digital data signals input from the APPRC, encodes the received signals with a spread code, adds an error correction code to the received signals, subjects the received signals, for instance, to digital modulation in accordance with an employed communication method, and then generates a digital transmission signal TXd. The BBPRC also receives the digital received signal RXd from the RFICBK, decodes the received signals with a spread code, adds an error correction code to the received signals, subjects the received signals, for instance, to digital demodulation in accordance with the employed communication method, and then outputs a digital data signal to the APPRC. Further, the BBPRC conveys information about various communication conditions, including the information about the reception frequency band and transmission frequency band used for communication purposes, to the RFICBK through the use of a communication control signal CLd. In accordance with the conveyed information, the control circuit CTL1 in the RFIC1 controls the aforementioned switch circuits.

As described above, the use of the mobile phone system to which the method according to the present embodiment is applied makes it possible to improve the reception sensitivity when a signal is received from the antenna ANT and reduce the power consumption when a signal is transmitted to the antenna ANT (this results in an increase in the duration of battery power). The mobile phone system shown in FIG. 4 is compliant with W-CDMA. However, a predefined circuit can be added to make the mobile phone system compliant with another communication standard (e.g., GSM (Global System for Mobile Communications)). Further, the mobile phone system can be compliant, for instance, with CDMA2000 in addition to W-CDMA.

Third Embodiment

Figure 5:
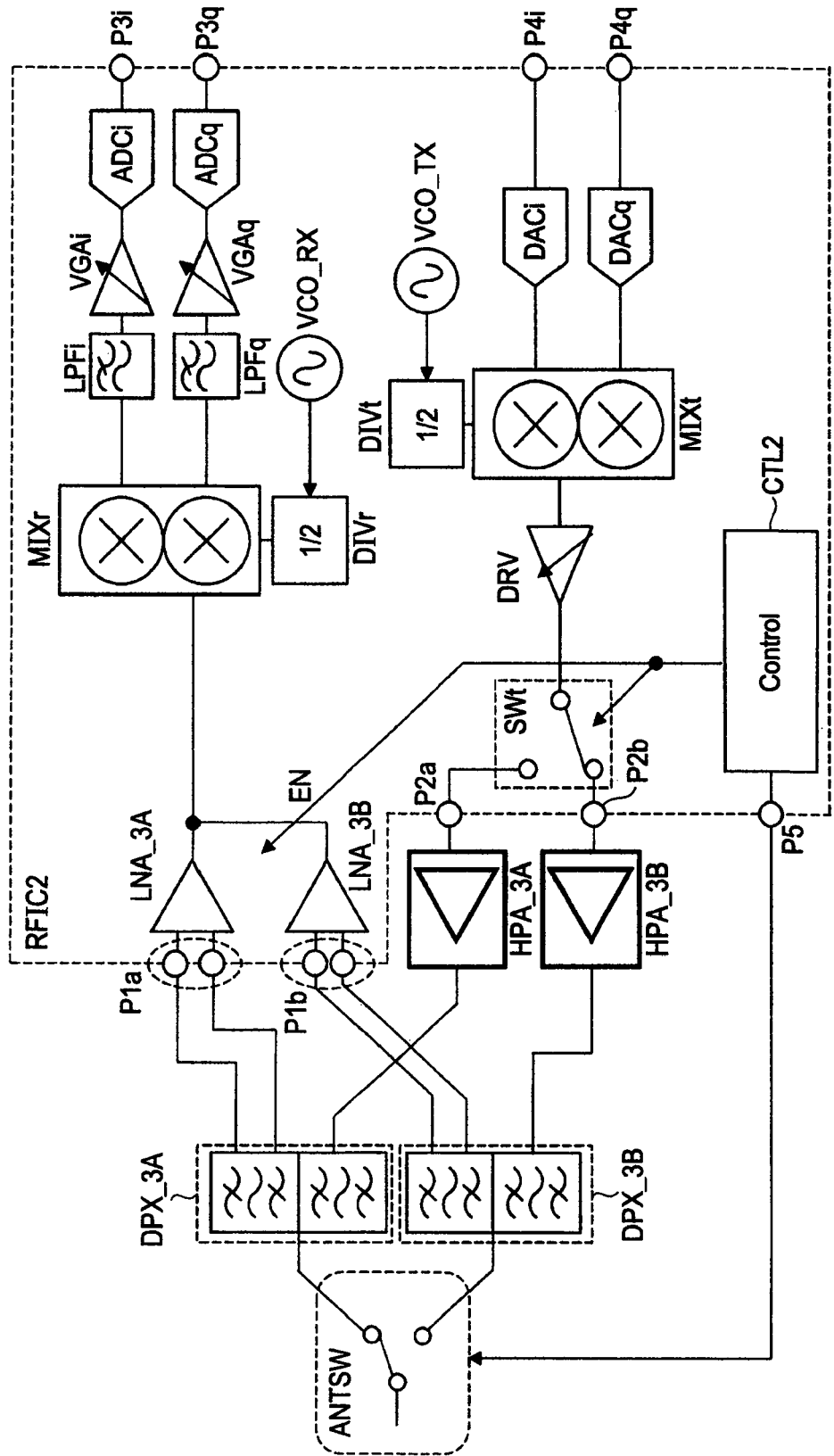
FIG. 5 is a block diagram illustrating an overview of an example configuration of the wireless communication system according to a third embodiment of the present invention.

A third embodiment of the present invention will now be described by explaining about an example modification derived from FIG. 3, which depicts the second embodiment. FIG. 5 is a block diagram illustrating an overview of an example configuration of the wireless communication system according to the third embodiment of the present invention. The wireless communication system shown in FIG. 5 differs from the one shown in FIG. 3 in that the former includes a high-frequency signal processing LSI (semiconductor integrated circuit device) RFIC2 whose internal circuit configuration differs from that of the high-frequency signal processing LSI RFIC1 shown in FIG. 3. More specifically, the RFIC2 differs from the RFIC1, which is shown in FIG. 3, in that the output nodes of the two low-noise amplifier circuits LNA_3A, LNA_3B are commonly coupled with the switch circuit SWr in the reception circuit deleted. Further, a control circuit CTL2 in the RFIC2 does not control the SWr, but controls the activation and deactivation of the LNA_3A and LNA_3B with an enable signal EN. The other elements of the RFIC2 are identical with the corresponding elements of the RFIC1, which is shown in FIG. 3.

When the reception frequency band is included in the reception passband (FLT_3A_RX) of the duplexer DPX_3A, the control circuit CTL2 activates the LNA_3A and deactivates the LNA_3B. When, on the contrary, the reception frequency band is included in the reception passband (FLT_3B_RX) of the duplexer DPX_3B, the control circuit CTL2 activates the LNA_3B and deactivates the LNA_3A. Specifically, this activation/deactivation control process is performed, for instance, by determining whether or not to supply an operating bias current to the LNA_3A and LNA_3B. The above-described example configuration makes it possible not only to provide the same advantages as the second embodiment, but also to reduce, for instance, the circuit area by eliminating the switch circuit and the power consumption by complementarily activating the low-noise amplifier circuits.

For the RFIC2, which is shown in FIG. 5, two external terminals P1$a$, P1$b$ and two low-noise amplifier circuits LNA_3A, LNA_3B need to be provided for one reception band (e.g., band 3) compliant with a communication standard (e.g., W-CDMA). When two low-noise amplifier circuits are furnished, the operating band handled by each low-noise amplifier circuit can be narrowed to provide ease of design and other advantages. However, it is anticipated that the resulting circuit area overhead may pose a small problem. As mentioned earlier, the low-noise amplifier circuits are integrated in the LSI. Therefore, the resulting circuit area overhead is not significant. From the viewpoint of further downsizing and cost reduction, however, it is preferred that the circuit area be reduced to the maximum possible extent. As such being the case, the use of an example configuration shown in FIG. 6 will be beneficial.

Figure 6:
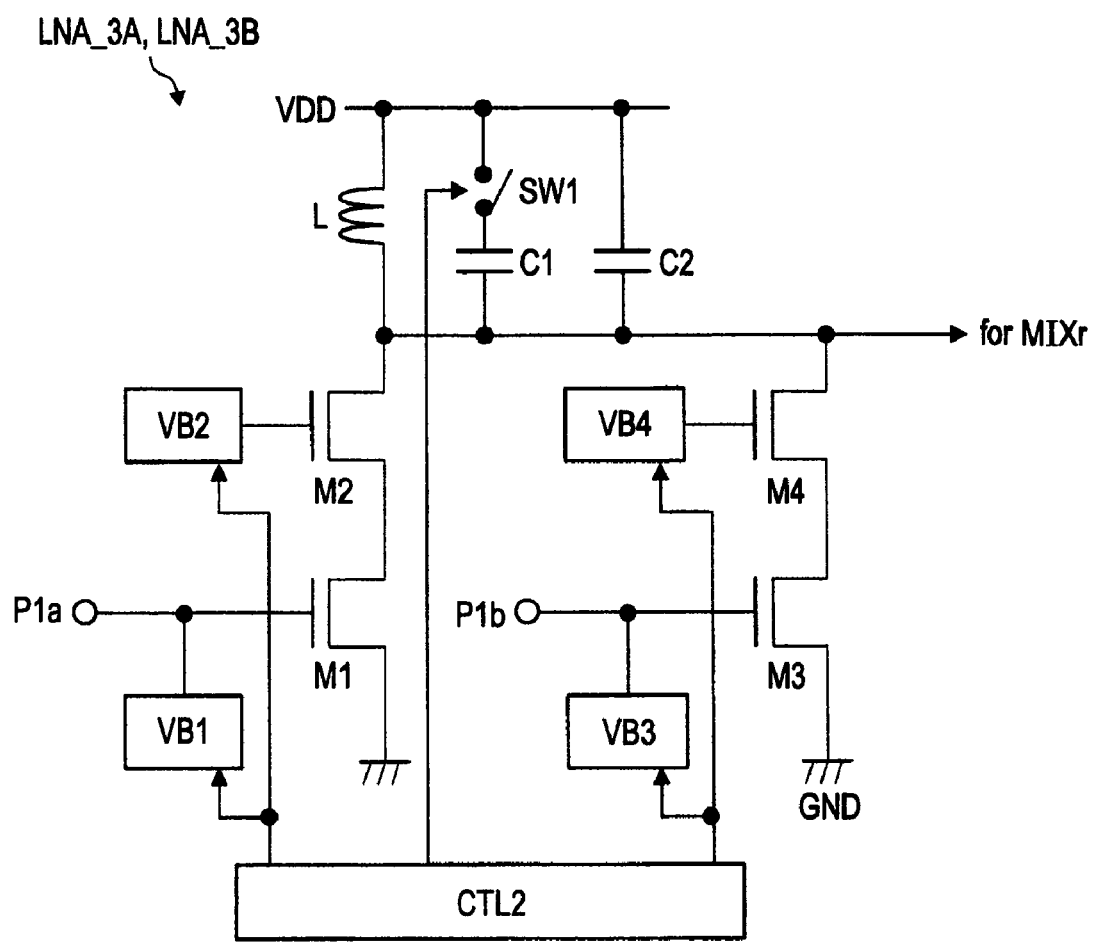
FIG. 6 is a circuit diagram illustrating an example configuration of low-noise amplifier circuits in a high-frequency signal processing LSI shown in FIG. 5.

FIG. 6 is a circuit diagram illustrating an example configuration of the low-noise amplifier circuits in the high-frequency signal processing LSI shown in FIG. 5. The low-noise amplifier circuits LNA_3A, LNA_3B shown in FIG. 6 includes transistors (n-channel MOS transistors in the currently used example) M1-M4, an inductor L, capacitors C1, C2, a switch circuit SW1, and bias circuits VB1-VB4. The bias circuits VB1-VB4 supply a bias voltage to the gates of the transistors M1-M4 under control of the control circuit CTL2. The gate of the transistor M1 inputs not only a bias voltage from the bias circuit VB1, but also a signal from the external terminal P1a. The drain of the transistor M1 is coupled to an output node for the mixer circuit MIXr through the transistor M2, which serves as a cascode stage. Similarly, the gate of the transistor M3 inputs not only a bias voltage from the bias circuit VB3, but also a signal from the external terminal P1b. The drain of the transistor M3 is coupled to an output node for the mixer circuit MIXr through the transistor M4, which serves as a cascode stage.

The inductor L and the capacitor C2 are coupled in parallel between the output node for the mixer circuit MIXr and a supply voltage VDD. The capacitor C1 is coupled between the output node for the MIXr and the VDD through the switch circuit SW1. The SW1 turns on and off under control of the CTL2. In the example configuration described above, the LNA_3A includes the VB1, VB2, M1, M2, L, C1, and C2, whereas the LNA_3B includes the VB3, VB4, M3, M4, L, and C2. In other words, FIG. 6 shows an example configuration in which the circuit area is reduced by allowing the LNA_3A and LNA_3B to share the L, C1, and C2, which form a load circuit.

When, for instance, the LNA_3A is to be activated with the LNA_3B deactivated, the CTL2 exercises control so that the VB1 and VB2 supply a bias, and that the VB3 and VB4 shut off the supply of the bias. Further, the SW1 turns on under control of the CTL2. This causes the LNA_3A to operate at a resonance frequency determined by the L, C1, and C2 (i.e., the aforementioned reception band 3A) to obtain an adequate gain. When, on the other hand, the LNA_3A is to be deactivated with the LNA_3B activated, the CTL2 exercises control so that the VB1 and VB2 shut off the supply of the bias, and that the VB3 and VB4 supply the bias. Further, the SW1 turns off under control of the CTL2. This causes the LNA_3B to operate at a resonance frequency determined by the L and C2 (i.e., reception band 3B having a higher frequency than reception band 3A) to obtain an adequate gain. The example configuration uses single-ended low-noise amplifier circuits. However, even when differential low-noise amplifier circuits are used, the load circuit can be similarly shared. The example configuration shown in FIG. 6 can be applied not only to the high-frequency signal processing LSI (RFIC2) shown in FIG. 5, but also to the high-frequency signal processing LSI (RFIC1) shown in FIG. 3.

Fourth Embodiment

Figure 7:
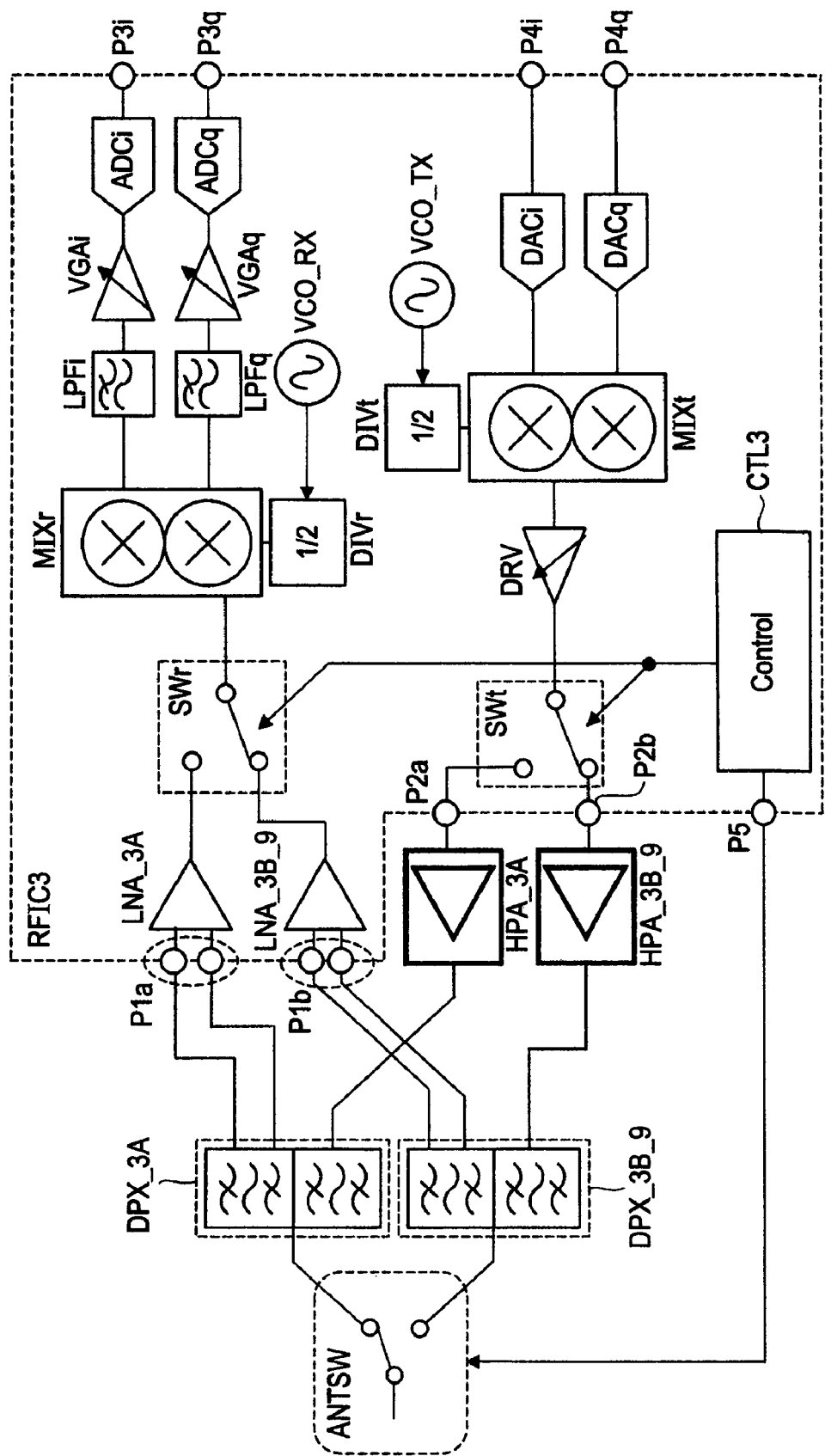
FIG. 7 is a block diagram illustrating an overview of an example configuration of the wireless communication system according to a fourth embodiment of the present invention.

A fourth embodiment of the present invention will now be described by explaining about another example modification derived from FIG. 3, which depicts the second embodiment. FIG. 7 is a block diagram illustrating an overview of an example configuration of the wireless communication system according to the fourth embodiment of the present invention. The wireless communication system shown in FIG. 7 differs from the one shown in FIG. 3 in that the band 3b circuit shown in FIG. 3 and the band 9 circuit for W-CDMA are commonalized. In other words, the duplexer DPX_3B shown in FIG. 3 is replaced by a duplexer DPX_3B_9 for band 3B and band 9 in FIG. 7. Similarly, the low-noise amplifier circuit LNA_3B and the power amplifier circuit HPA_3B in FIG. 3 are replaced by a low-noise amplifier circuit LNA_3B_9 for band 3B and band 9 and a power amplifier circuit HPA_3B_9. The other elements are identical with the corresponding elements of the wireless communication system shown in FIG. 3.

The communication standard states that band 9 of W-CDMA includes transmission band 9 of 1750 to 1785 MHz and reception band 9 of 1845 to 1880 MHz. The passbands of the aforementioned transmission band 3B and reception band 3B are virtually the same as those of transmission band 9 and reception band 9. Therefore, the circuits for band 9 and band 3B can be commonly used. When, for instance, a baseband processing circuit (not shown) issues an instruction for using band 3B or band 9, a control circuit CTL3 in a high-frequency signal processing LSI (semiconductor integrated circuit device) RFIC3 in FIG. 7 couples the ANTSW to the DPX_3B_9 through the external terminal P5, and couples the switch circuits SWr, SWt to the P1b and P2b, respectively.

When the above-described example configuration is used, the advantages described with reference to FIG. 3 can be obtained in a so-called multi-band mobile phone, which is compliant with plural bands of W-CDMA, without incurring a significant circuit area overhead. In other words, no particular circuit needs to be added because the band 9 circuits, which are intrinsically required for multi-band capabilities, are appropriated for band 3B. This makes it possible to reduce the size of the system. Here, it is assumed that bands 3 and 9 of W-CDMA are used. However, the present embodiment is not limited to the use of W-CDMA bands 3 and 9. The present embodiment is applicable to a situation where segmented transmission bands and segmented reception bands, which are obtained by splitting a transmission band and a reception band compliant with a communication standard, are substantially equivalent to a different transmission band and reception band compliant with the communication standard. In other words, benefits can be gained when the band splitting is performed in such a manner that the segmented transmission bands and segmented reception bands can be used together with the different transmission band and reception band.

Fifth Embodiment

Figure 8:
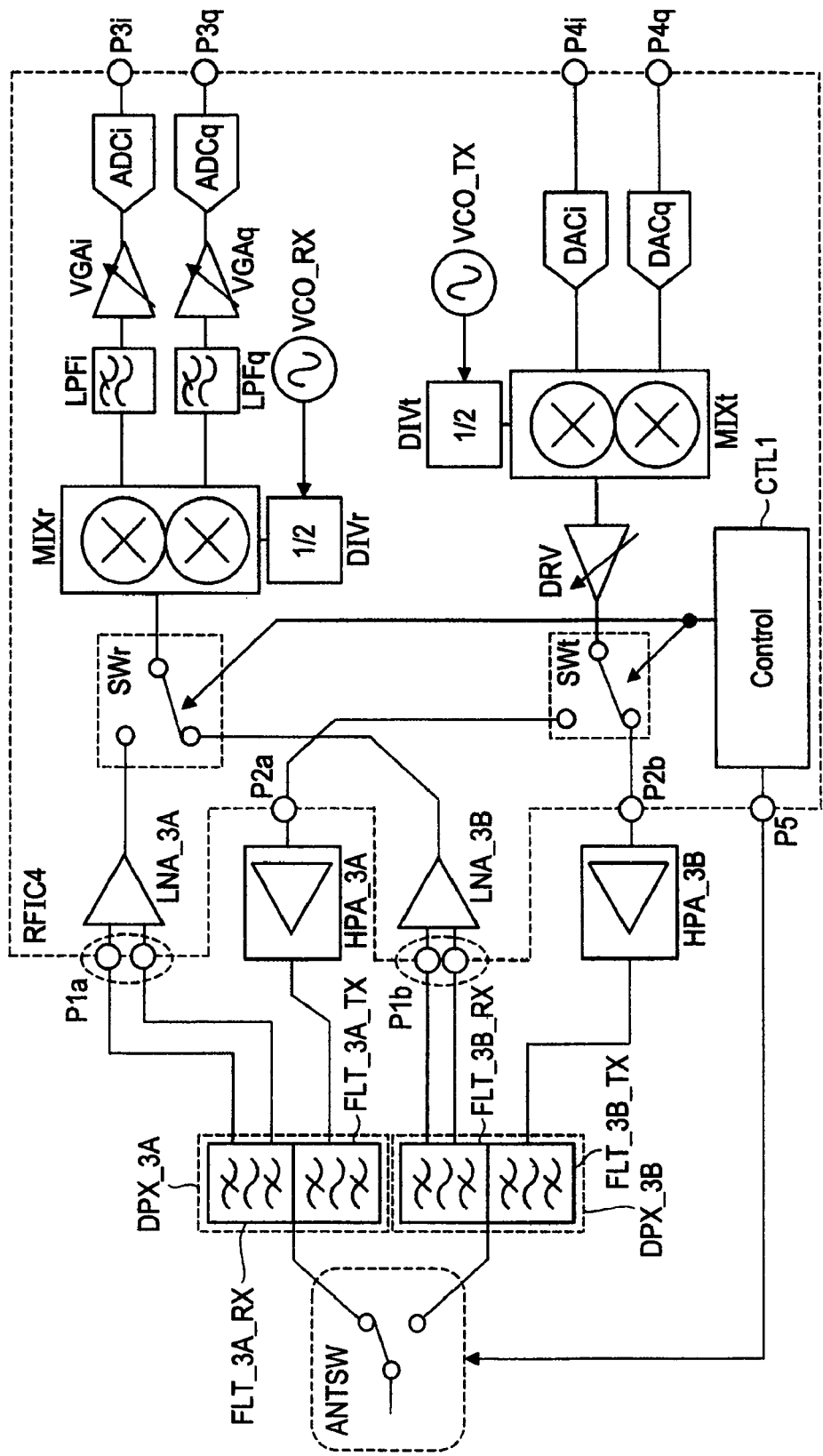
FIG. 8 is a block diagram illustrating an overview of an example configuration of the wireless communication system according to a fifth embodiment of the present invention.

A fifth embodiment of the present invention will now be described by explaining about another example modification derived from FIG. 3, which depicts the second embodiment. FIG. 8 is a block diagram illustrating an overview of an example configuration of the wireless communication system according to the fifth embodiment of the present invention. The wireless communication system shown in FIG. 8 is the same as the one shown in FIG. 3 except that some external terminals P1a, P1b, P2a, P2b of a high-frequency signal processing LSI (semiconductor integrated circuit device) RFIC4 are arranged in a different order. In the earlier-described RFIC1, which is shown in FIG. 3, the relative front-rear positional relationship between the external terminals oriented in a certain direction is such that the P1a, P1b, P2a, and P2b are arranged in the order named. In the RFIC4, which is shown in FIG. 8, the relative front-rear positional relationship between the external terminals oriented in a certain direction is such that the P1a, P2a, P1b, and P2b are arranged in the order named.

When the above-described example configuration is applied to the system shown in FIG. 3, there is an intersection point between the wiring coupling the P1b to the duplexer DPX_3B and the wiring coupling the P2a to the duplexer DPX_3A. However, when the same example configuration is applied to the system shown in FIG. 8, there is no such intersection point. These wirings are used as wires laid over a wiring board. Therefore, if there is any intersection point, it is anticipated that the size of the system may increase due to wiring routing, and that the signal quality provided by the wiring may deteriorate. As such being the case, benefits can be gained when the external terminals are arranged as shown in FIG. 8 to move the intersection point from the wiring board to the inside of the semiconductor chip (RFIC4). Unlike the intersection point over the wiring board, the intersection point within the semiconductor chip does not increase the size of the system or deteriorate the signal quality.

The external terminals may be arranged in any manner on condition that their relationship to the duplexers DPX_3A, DPX_3B produces no intersection point over the wiring board. The arrangement of the external terminals can be changed as appropriate as far as the above condition is met. When, for instance, the transmission filter circuit and reception filter circuit are positionally exchanged in each duplexer, the band 3A transmission terminal (P2a), band 3A reception terminal (P1a), band 3B transmission terminal (P2b), and band 3B reception terminal (P1b) can be arranged in the order named. Alternatively, when the transmission filter circuit and reception filter circuit are positionally exchanged in either of the duplexers, the P1a, P2a, P2b, and P1b can be arranged in the order named. In other words, the arrangement of the external terminals is acceptable as far as neither the band 3B reception terminal (P1b) nor the band 3B transmission terminal (P2b) is disposed between the band 3A reception terminal (P1a) and the band 3A transmission terminal (P2a). It is obvious that the arrangement of the external terminals is applicable to the example configurations shown, for instance, in FIGS. 5 and 7.

Sixth Embodiment

Figure 9:
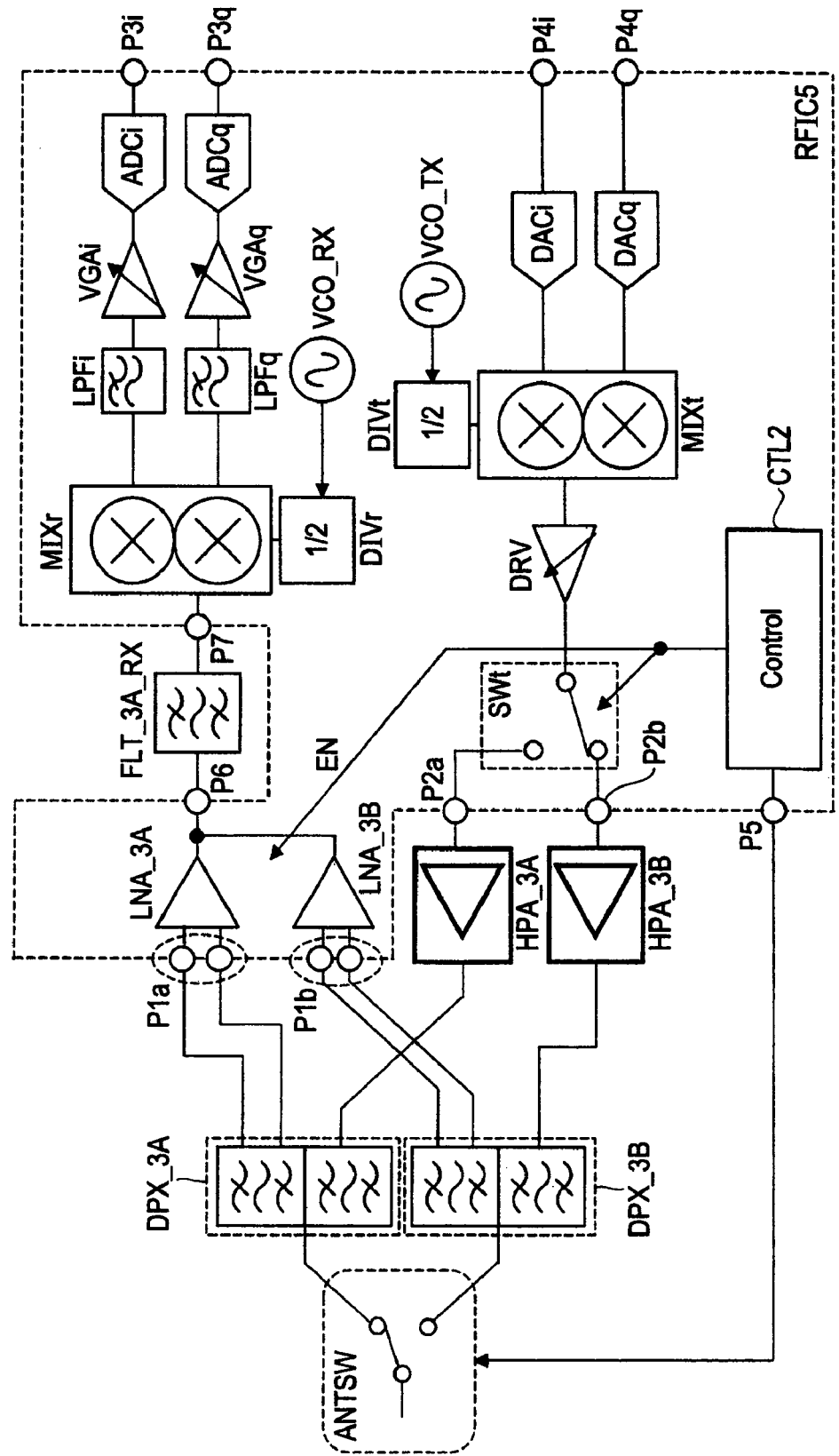
FIG. 9 is a block diagram illustrating an overview of an example configuration of the wireless communication system according to a sixth embodiment of the present invention.

A sixth embodiment of the present invention will now be described by explaining about an example modification derived from FIG. 5, which depicts the third embodiment. FIG. 9 is a block diagram illustrating an overview of an example configuration of the wireless communication system according to the sixth embodiment of the present invention. The wireless communication system shown in FIG. 9 is the same as the one shown in FIG. 5 except that a high-frequency signal processing LSI (semiconductor integrated circuit device) RFIC5 further includes external terminals P6, P7, and that a filter circuit (bandpass filter circuit) FLT_3_RX is disposed between these two external terminals P6, P7.

Output signals of the low-noise amplifier circuits LNA_3A, LNA_3B are both output from the external terminal P6, then input from the external terminal P7 through the FLT_3_RX, and conveyed to the mixer circuit MIXr. When the output signals of the LNA_3A and LNA_3B are bandwidth-limited by the FLT_3_RX as described above, the noise figure (NF) in the reception system may be further improved to increase the reception sensitivity although the size of the system is slightly increased.

Seventh Embodiment

Figure 10:
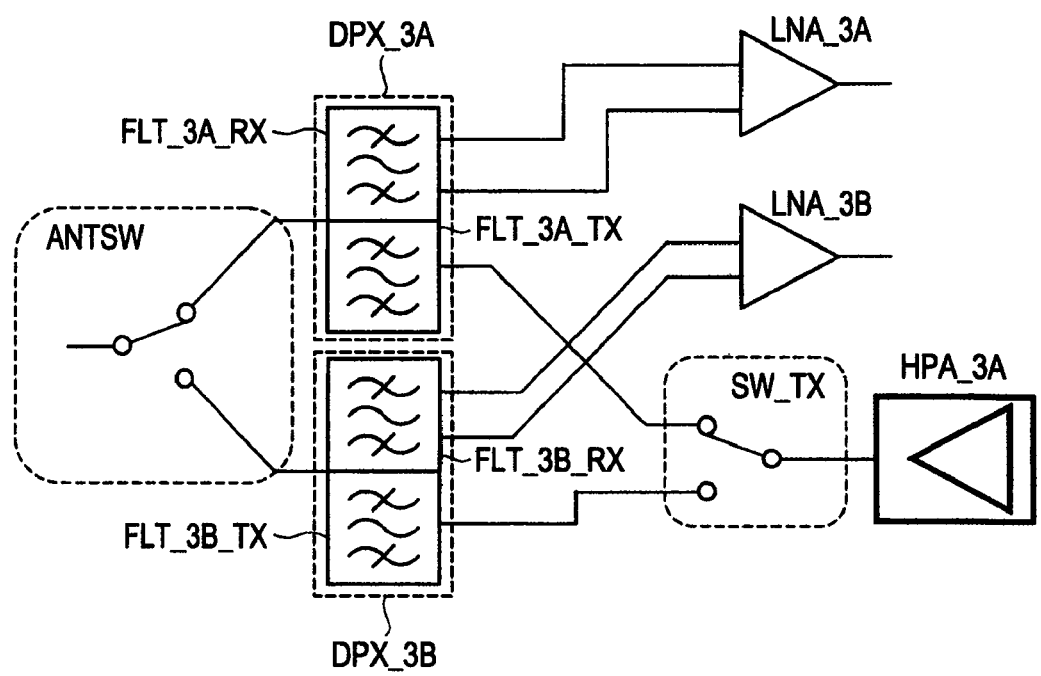
FIG. 10 is a schematic diagram illustrating an example configuration of essential parts of the wireless communication system according to a seventh embodiment of the present invention.

A seventh embodiment of the present invention will now be described by explaining about an example modification derived from FIG. 1, which depicts the first embodiment. FIG. 10 is a schematic diagram illustrating an example configuration of essential parts of the wireless communication system according to the seventh embodiment of the present invention. The wireless communication system shown in FIG. 10 is the same as the one shown in FIG. 1 except that transmission band 3A and transmission band 3B share a power amplifier circuit HPA_3. An output of the HPA_3 is selectively coupled through a switch circuit SW_TX to either the filter circuit FLT_3A_TX in the duplexer DPX_3A or the filter circuit FLT_3B_TX in the duplexer DPX_3B. A selection signal of the SW_TX can be supplied, for instance, from the external terminal P5, which is shown in FIG. 3.

When the above-described example configuration is used, the power consumption of the power amplifier circuit might increase due to a loss in the SW_TX unlike the case where the example configuration shown in FIG. 1 is used. However, as the number of power amplifier circuits is decreased to one, the size of the system can be reduced. Power amplifier circuits can be relatively large parts. Therefore, when the employed system is such that system downsizing and cost reduction take precedence over a decrease in the power consumption of power amplifier circuits, the above-described example configuration should be adopted. As the achievement of an adequate reception sensitivity is an important factor for the system, the reception configuration is the same as shown in FIG. 1. More specifically, the reception configuration includes two low-noise amplifier circuits LNA, and no switch circuit is provided for the low-noise amplifier circuits LNA.

Figure 11:
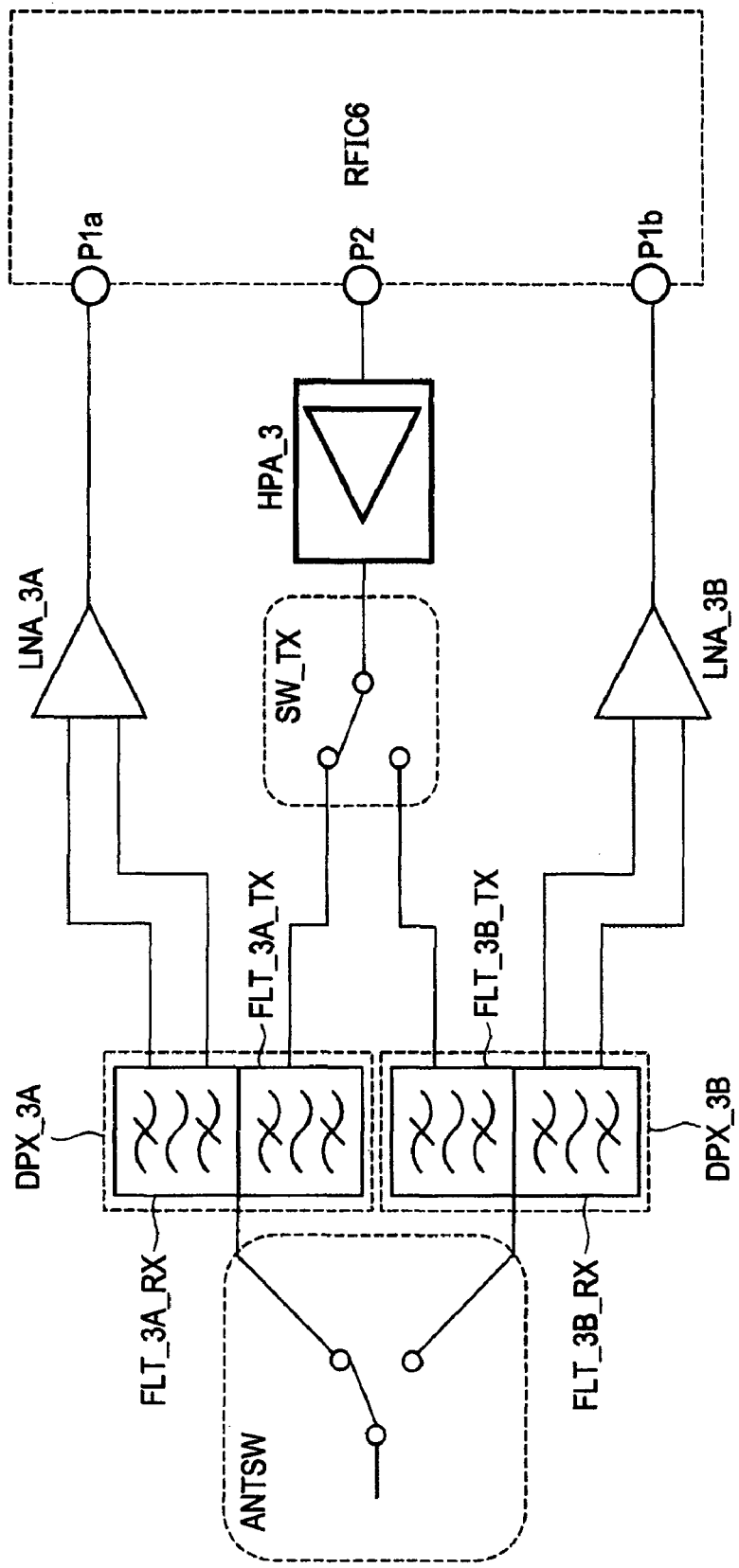
FIG. 11 is a schematic diagram illustrating an example configuration of the high-frequency signal processing LSI and other parts of the wireless communication system shown in FIG. 10.

When the wireless communication system shown in FIG. 10 is to be combined with a high-frequency signal processing LSI (semiconductor integrated circuit device), the fifth embodiment can be applied to the wireless communication system so as to employ the positional relationship shown, for instance, in FIG. 11. FIG. 11 is a schematic diagram illustrating an example configuration of the high-frequency signal processing LSI and other parts of the wireless communication system shown in FIG. 10. In the wireless communication system shown in FIG. 11, the transmission filter circuit FLT_3A_TX of the DPX_3A and the transmission filter circuit FLT_3B_TX of the DPX_3B are disposed adjacent to each other. The high-frequency signal processing LSI (semiconductor integrated circuit device) RFIC6 includes external terminals P1a, P2, P1b. The P2 is disposed between the P1a and the P1b. The P1a is coupled to the reception filter circuit FLT_3A_RX in the DPX_3A. The P2 is coupled to an input of the HPA_3. The P1b is coupled to the reception filter circuit FLT_3B_RX in the DPX_3B. The use of the above-described positional relationship makes it possible to produce no intersection point over the wiring board, as is the case with the fifth embodiment.

While the present invention has been described in terms of preferred embodiments, it will be understood by those skilled in the art that the invention is not limited to those preferred embodiments. Various modifications may be made without departure from the scope and spirit of the invention.

For example, the foregoing description assumes that the present invention is applied to a mobile phone. However, the present invention can also be applied to devices used at a base station for mobile phones. Further, the present invention is applicable not only to mobile phones, but also to wireless communication systems that use a duplexer.

What is claimed is:

1. A wireless communication system comprising:
a first duplexer that is provided in correspondence with a first standard band defined by a communication standard and includes a first transmission passband for transmission and a first reception passband for reception;
a second duplexer that is provided in correspondence with the first standard band and includes a second transmission passband for transmission and a second reception passband for reception;
a first low-noise amplifier circuit that amplifies a received signal input through the first duplexer; and
a second low-noise amplifier circuit that amplifies a received signal input through the second duplexer,
wherein a first transmission standard band and a first reception standard band are defined for the first standard band,
wherein the first transmission passband is set in correspondence with a first segmented transmission band, which is a part of the first transmission standard band,
wherein the first reception passband is set in correspondence with a first segmented reception band, which is a part of the first reception standard band,
wherein the second transmission passband is set in correspondence with a second segmented transmission band, which is another part of the first transmission standard band and higher in frequency than the first segmented transmission band, and wherein the second reception passband is set in correspondence with a second segmented reception band, which is another part of the first reception standard band and higher in frequency than the first segmented reception band.

2. The wireless communication system according to claim 1, further comprising:
a first power amplifier circuit that outputs a transmission signal to the first duplexer; and
a second power amplifier circuit that outputs a transmission signal to the second duplexer.

3. The wireless communication system according to claim 1,
wherein the upper-limit frequency of the first segmented transmission band is equal to the lower-limit frequency of the second segmented transmission band, and
wherein the upper-limit frequency of the first segmented reception band is equal to the lower-limit frequency of the second segmented reception band.

4. The wireless communication system according to claim 1,
wherein the output of the first low-noise amplifier circuit and the output of the second low-noise amplifier circuit are commonly coupled, and
wherein the first low-noise amplifier circuit and the second low-noise amplifier circuit are complementarily activated.

5. The wireless communication system according to claim 1, wherein the first duplexer or the second duplexer is set in correspondence not only with the first standard band but also with a second standard band defined by the communication standard.

6. The wireless communication system according to claim 1, wherein the wireless communication system is a mobile phone system.

7. A wireless communication system comprising:
a first duplexer that is provided in correspondence with a first standard band defined by a communication standard and includes a first transmission passband for transmission and a first reception passband for reception;
a second duplexer that is provided in correspondence with the first standard band and includes a second transmission passband for transmission and a second reception passband for reception;
a first low-noise amplifier circuit that amplifies a received signal input through the first duplexer; and
a second low-noise amplifier circuit that amplifies a received signal input through the second duplexer,
wherein a first transmission standard band ranging from a first transmission frequency to a second transmission frequency and a first reception standard band ranging from a first reception frequency to a second reception frequency are defined for the first standard band,
wherein the first transmission passband ranges from the first transmission frequency to a third transmission frequency (first transmission frequency<third transmission frequency<second transmission frequency),
wherein the first reception passband ranges from the first reception frequency to a third reception frequency (first reception frequency<third reception frequency<second reception frequency),
wherein the second transmission passband ranges from a fourth transmission frequency to the second transmission frequency (first transmission frequency<fourth transmission frequency<second transmission frequency), and
wherein the second reception passband ranges from a fourth reception frequency to the second reception frequency (first reception frequency <fourth reception frequency <second reception frequency).

8. The wireless communication system according to claim 7, further comprising:
a first power amplifier circuit that outputs a transmission signal to the first duplexer; and
a second power amplifier circuit that outputs a transmission signal to the second duplexer.

9. The wireless communication system according to claim 7,
wherein the third transmission frequency is equal to the fourth transmission frequency, and
wherein the third reception frequency is equal to the fourth reception frequency.

10. A semiconductor integrated circuit device formed on a semiconductor chip, the semiconductor integrated circuit device comprising:
a first and a second external input terminals that are provided for a first standard band defined by a communication standard;
a first low-noise amplifier circuit that amplifies an input signal from the first external input terminal; and
a second low-noise amplifier circuit that amplifies an input signal from the second external input terminal,
wherein a first transmission standard band and a first reception standard band are defined for the first standard band, the first reception standard band being different from the first transmission standard band in the range of frequencies,
wherein the first external input terminal inputs a received signal within a first segmented reception band, which is a part of the first reception standard band, and
wherein the second external input terminal inputs a received signal within a second segmented reception band, which is another part of the first reception standard band and higher in frequency than the first segmented reception band.

11. The semiconductor integrated circuit device according to claim 10, further comprising:
a first and a second external output terminals that are provided in correspondence with the first standard band;
a driver circuit that outputs a transmission signal; and
a switch circuit that selectively conveys the transmission signal to either the first external output terminal or the second external output terminal,
wherein the first external output terminal outputs the transmission signal within a first segmented transmission band, which is a part of the first transmission standard band, and
wherein the second external output terminal outputs the transmission signal within a second segmented transmission band, which is another part of the first transmission standard band and higher in frequency than the first segmented transmission band.

12. The semiconductor integrated circuit device according to claim 11, wherein neither the second external input terminal nor the second external output terminal is disposed between the first external input terminal and the first external output terminal.

13. The semiconductor integrated circuit device according to claim 10, wherein the upper-limit frequency of the first segmented reception band is equal to the lower-limit frequency of the second segmented reception band.

14. The semiconductor integrated circuit device according to claim 10,
wherein the output of the first low-noise amplifier circuit and the output of the second low-noise amplifier circuit are commonly coupled, and
wherein the first low-noise amplifier circuit and the second low-noise amplifier circuit are complementarily activated.

15. The semiconductor integrated circuit device according to claim 14, wherein an amplification load circuit for the first low-noise amplifier circuit and an amplification load circuit for the second low-noise amplifier circuit are partly shared.

16. The semiconductor integrated circuit device according to claim 10, wherein the first and second external input terminals are provided in correspondence not only with the first standard band but also with a second standard band defined by the communication standard.

* * * * *